United States Patent [19]

Mariotti

[11] E Patent Number: Re. 33,712

[45] Reissued Date of Patent: Oct. 8, 1991

[54] DEEP-FRYER PAN FOR INDUSTRIAL FRYERS

[75] Inventor: Rene G. Mariotti, Saint Cloud, France

[73] Assignee: Ore-Ida Vended Products, Inc., Boise, Id.

[21] Appl. No.: 16,194

[22] Filed: Feb. 18, 1987

Related U.S. Patent Documents

Reissue of:

[64] Patent No.: 4,502,372
Issued: Mar. 5, 1985
Appl. No.: 608,929
Filed: May 11, 1984

U.S. Applications:

[63] Continuation of Ser. No. 433,875, Oct. 13, 1985, abandoned, which is a continuation-in-part of Ser. No. 356,803, Mar. 10, 1982, abandoned.

[30] Foreign Application Priority Data

Mar. 13, 1981 [FR] France ..... 8105027

[51] Int. Cl.[5] ..... A47J 37/12

[52] U.S. Cl. ..... 99/330; 99/334; 99/356; 99/357; 99/407; 99/408; 426/438

[58] Field of Search ..... 99/330, 334, 407, 408, 99/356, 357; 426/438–441

[56] References Cited

U.S. PATENT DOCUMENTS

| | | |
|---|---|---|
| Re. 23,890 | 11/1954 | Chase . |
| 416,889 | 12/1889 | Barnard . |
| 1,652,309 | 12/1927 | Kingdon . |
| 2,123,663 | 7/1938 | Roach . |
| 2,164,103 | 6/1939 | Baum . |
| 2,287,396 | 6/1942 | Roth . |
| 2,293,073 | 8/1942 | Osborne et al. . |
| 2,347,204 | 4/1944 | Lindsay . |
| 2,374,076 | 4/1945 | Burckhardt et al. . |
| 2,564,230 | 8/1951 | Pitney . |
| 2,743,896 | 5/1956 | Nauta . |
| 3,044,880 | 7/1962 | Bogyo et al. . |
| 3,050,404 | 8/1962 | Traisman . |
| 3,070,122 | 12/1962 | Fricke et al. . |
| 3,085,020 | 4/1963 | Backinger et al. . |
| 3,210,193 | 10/1965 | Martin . |
| 3,237,804 | 3/1966 | Bardy et al. . |
| 3,245,800 | 4/1966 | Sanders . |
| 3,314,416 | 4/1967 | Wagner . |
| 3,398,672 | 8/1968 | Hoeberigs . |
| 3,410,199 | 11/1968 | Quednau . |
| 3,431,834 | 3/1969 | Keathley et al. . |
| 3,431,835 | 3/1969 | Angold . |
| 3,448,677 | 6/1969 | Dexters . |
| 3,594,188 | 7/1974 | Huxsoll et al. . |
| 3,597,239 | 8/1971 | Vahlsing . |
| 3,608,472 | 9/1971 | Pelster . |
| 3,610,133 | 10/1971 | Mies, Jr. et al. . |
| 3,613,550 | 10/1971 | Thompson . |
| 3,644,129 | 2/1972 | Sloan . |
| 3,649,290 | 3/1972 | Angold . |
| 3,649,305 | 3/1972 | Wilder . |
| 3,655,411 | 4/1972 | Albright . |
| 3,667,373 | 6/1972 | Sicher et al. . |
| 3,667,374 | 6/1972 | Holmes . |
| 3,677,170 | 7/1972 | Shelton et al. . |
| 3,685,432 | 8/1972 | Hoeberigs . |
| 3,690,247 | 9/1972 | Van Cleven et al. . |
| 3,729,323 | 4/1973 | Nonaka et al. . |
| 3,734,744 | 5/1973 | Albright . |

FOREIGN PATENT DOCUMENTS

| | | |
|---|---|---|
| 0000012 | 12/1978 | European Pat. Off. . |
| 737632 | 7/1943 | Fed. Rep. of Germany . |
| 2166836 | 8/1973 | France . |
| 2501491 | 9/1982 | France . |
| WO85/05703 | 12/1985 | PCT Int'l Appl. . |
| 364951 | 11/1962 | Switzerland . |

(List continued on next page.)

*Primary Examiner*—John Petrakes
*Attorney, Agent, or Firm*—Burns, Doane, Swecker & Mathis

[57] ABSTRACT

A deep-fry pan for industrial deep-fryers. The pan is hermetically closed during operation to minimize contact between oil contained in the pan and ambient air and to minimize pollution of the room in which the fryer is located.

42 Claims, 3 Drawing Sheets

U.S. PATENT DOCUMENTS 3,793,940 2/1974 Albright et al. .
3,809,777 5/1974 Thompson .
3,818,820 6/1974 Harris et al. .
3,853,044 12/1974 Albright et al. .
3,861,286 1/1975 Albright .
3,870,193 3/1975 Schneider .
3,881,028 4/1975 Capossela, Jr. et al. .
3,894,482 7/1975 Murphy .
3,934,046 1/1976 Weaver et al. .
3,973,481 8/1976 Mies .
3,981,232 9/1976 Williamson .
4,031,820 6/1977 Reed .
4,109,020 8/1978 Gorfien et al. .
4,110,481 8/1978 Albright et al. .
4,219,575 8/1980 Saunders et al. .
4,228,196 10/1980 Weaver et al. .
4,228,730 10/1980 Schneider et al. .
4,254,153 3/1981 Ross et al. .
4,256,777 3/1981 Weaver et al. .
4,269,861 5/1981 Caridis et al. .
4,297,377 10/1981 Harney et al. .
4,317,842 3/1982 El-Hag et al. .
4,359,935 11/1982 Murray .
4,428,280 1/1984 Williams et al. .
4,447,459 5/1984 Balboni et al. .
4,457,947 7/1984 Schmidt .
4,459,902 7/1984 Angold .
4,478,140 10/1984 Bullock .
4,489,646 12/1984 Schmidt et al. ..... 99/330
4,489,647 12/1984 Stamps et al. .
4,502,372 3/1985 Mariotti .
4,505,193 3/1985 Mariotti .
4,505,194 3/1985 Bishop et al. .
4,539,898 9/1985 Bishop et al. .
4,551,340 11/1985 El-Hag et al. .
4,579,743 4/1986 Hullah .
4,590,361 5/1986 Del Fabbro .
4,632,838 12/1986 Doenges .

DEEP-FRYER PAN FOR INDUSTRIAL FRYERS

Matter enclosed in heavy brackets [ ] appears in the original patent but forms no part of this reissue specification; matter printed in italics indicates the additions made by reissue.

This is a continuation of application Ser. No. 433,875 filed Oct. 13, 1982, now abandoned, which in turn is a continuation-in-part of application Ser. No. 356,803, filed Mar. 10, 1982, now abandoned.

BACKGROUND AND SUMMARY OF THE INVENTION

The present invention relates to a pan for an industrial deep-fryer, especially adapted for cooking successive proportioned amounts of frozen foods consumable after frying and for distributing the cooked foods into cups.

The deep-fryer of the present invention may be constructed in the form of a coin or token operated machine for distributing foods on user demand. For example, the food may be potato chips or any other foods able to be frozen and then cooked by frying, such as for example, fishcakes, fritters etc.

Industrial deep-fryers of the general above-mentioned type are already known. However, they have not met with commercial success because of disappointing results attendant their use. In particular, a major problem with the known devices is that the frying oil is exposed to air and light.

Therefore, there is provided an industrial deep fryer and a pan for an industrial deep fryer which does not suffer this operational disadvantage.

In the deep-fryer of the invention, the frying pan is formed with a hermetically sealed enclosure comprising a lateral door for loading and unloading a perforated basket adapted to dipping the foods in the oil in the pan, this perforated basket being extended at its upper part, on the door side, by a deflector integral with the door so that opening of the door exposes at least part of the deflector to the outside of the enclosure.

Advantageously, the bottom of the deflector is coextensive with the door and the bottom of the door is pivotably mounted on the wall of the enclosure. Thus, the frying pan only opens outwardly for loading and unloading the basket. The movement of the basket is connected to that of the door, which eliminates the need for a special mechanism for removing the basket from the pan.

In known deep-fryers, an open pan is included in a cabinet which comprises means for circulating air between an air inlet and an air outlet formed in the walls of the cabinet, with a filtering device placed therebetween in the air outlet circuit.

Ventilating means sucks in the ambient air, causes it to flow in the vicinity of the oil during use and discharges it into the atmosphere. The inevitable result is pollution, because the volume of air handled is high and because the filtering device is generally insufficient.

According to the invention, downstream of the filtering device, the air circuit is connected to the air inlet. The volume of air in which the frying takes place is not discharged into the atmosphere. Rather, it flows in a closed circuit, while the greases which it conveys are removed therefrom after having passed over the surface of the frying oil, by the filtering device. Using this arrangement, filtering is carried out more efficiently because the volume of air treated by the filter is small. Water vapor driven from the foods during frying is condensed outside the pan and discharged before the air is recycled.

It is not indispensable for the filtering device to remove the odors which may exist in the recirculated air flow since these odors are greatly reduced by the care taken in conserving the oil and since, in any case, they are only perceptible inside the closed pan.

In known machines, the frozen foods to be fried are stored in a thermally insulated compartment and maintained at an appropriate temperature and, channelled by a hopper, they fall either into a hollow measure in a cylinder stopping up the opening of the hopper, in which case the proportioning of each portion is volumetric, or on to the scale of a balance, in which case the porportioning is by weight. It is to this second type of machine that the invention pertains.

More precisely, the unit for conserving frozen foods and proportioning successive portions of these foods comprises a thermally insulated closed compartment maintained at an appropriate temperature, which compartment comprises:

a frozen food container opening on to a conveyor means;

conveyor means collecting the foods coming from the container and feeding them to the receiving scale of a balance;

a balance whose scale receiving products to be weighed comprises discharge means which open above an aperture formed in the wall of the compartment;

means controlling the advance of the conveyor means in response to indications supplied by the balance; and means controlling the operation of the means for discharging the receiving scale of the balance, in response to external solicitation.

In a preferred embodiment, the receiving scale of the balance is in the form of a dish whose bottom is formed by bringing together the free edges of separate elements forming the dish, these elements being pivotally mounted so as to be able to move closer together (weighing position) or to move away from each other (position for discharging the weighed portion).

Thus, the weighed foods fall naturally through the open bottom of the dish and cannot be crushed by any moving part.

BRIEF DESCRIPTION OF THE DRAWINGS

The presently preferred best mode embodiment of the invention is described hereafter by way of a non-limiting example, with reference to the accompanying drawings in which.

DETAILED DESCRIPTION OF THE PREFERRED EMBODIMENT

Figure 1:
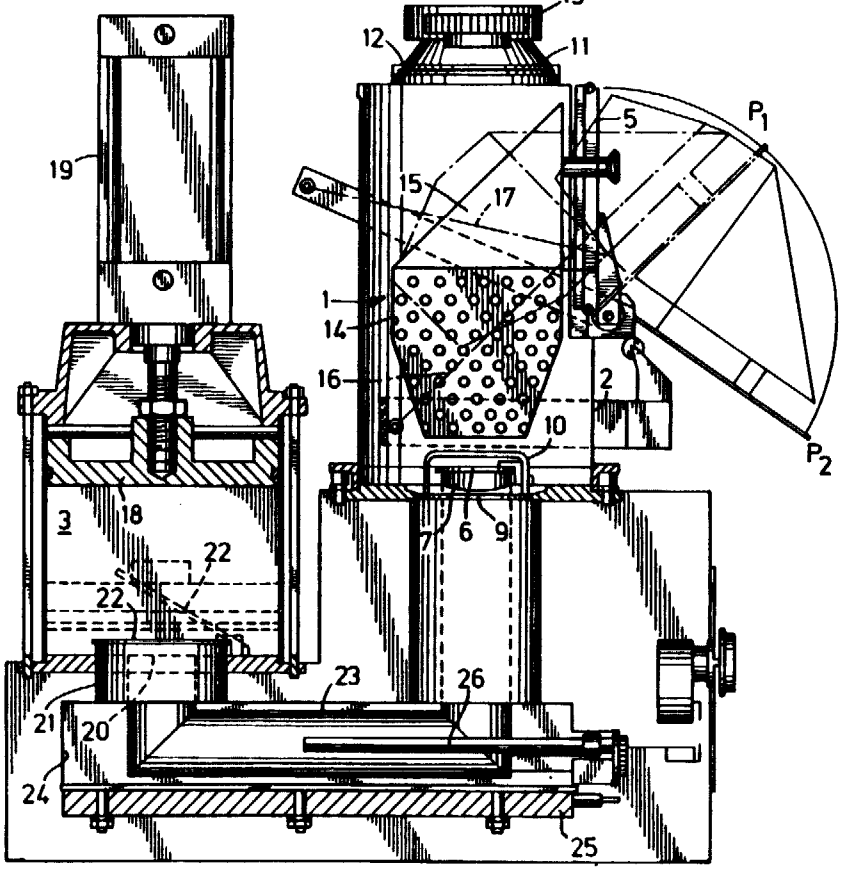
FIG. 1 is a section of the deep-fry/oil reservoir assembly of the deep-fryer.

The deep-fryer of the invention includes a frozen food conserving and distributing unit (shown in FIG. 5), comprising: means for proportioning successive portions of foods (shown in FIG. 6), which weighs a specific amount of foods and causes them to fall into a deep-fry basket and a deep-fry pan (shown in FIG. 1), supplied with oil from an oil reservoir 3 (shown in FIG. 1).

These different component elements and the operation thereof will be described hereafter, beginning with the deep-fryer part.

Figure 2:
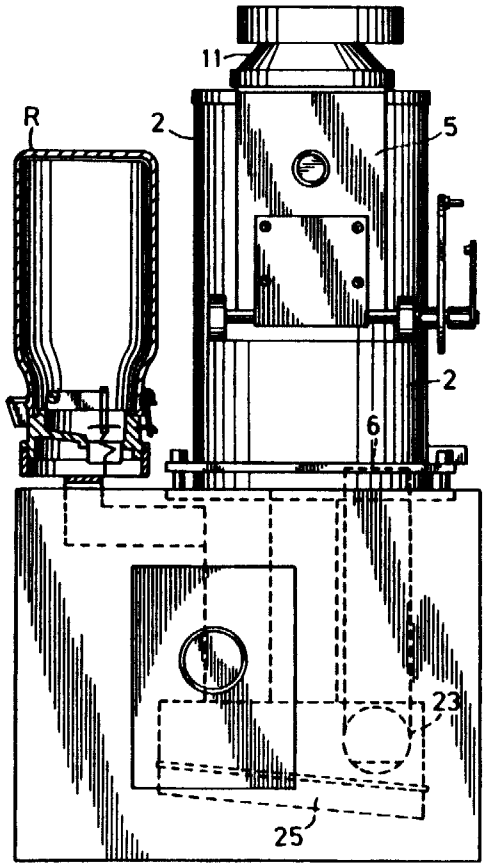
FIG. 2 is a side view of the assembly of FIG. 1.
Figure 4:
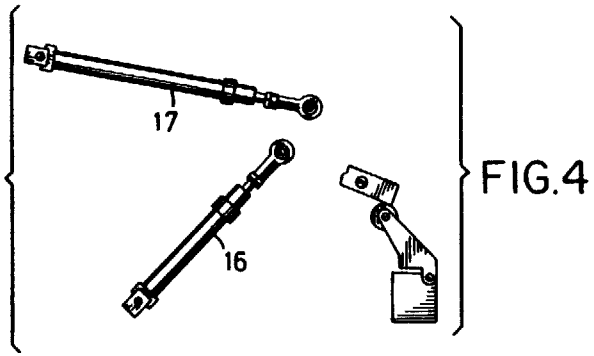
FIG. 4 shows the positioning of the jacks controlling the opening of the door of the pan.
Figure 3:
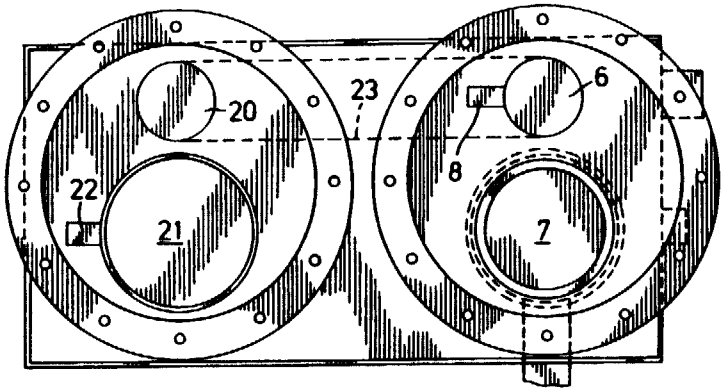
FIG. 3 is a top view of the ducts connecting together the oil reservoir and the pan.

Referring first to FIGS. 1 and 2, there is shown a deep-fry pan 2 formed as a closed enclosure accessible from the outside through a door 5. The contact zone between door 5 and the opening of the pan which this door 5 closes off is fitted with a silicon seal. The bottom of the pan comprises an oil supply opening 6 and an oil removal opening 7 clearly visible in FIG. 3. The oil supply opening 6 is provided with a valve 8 which only opens under the effect of a positive pressure exerted from outside pan 2. A filtering device 9 having a handle 10 for removal thereof, is disposed on the removal opening 7. At its upper part, the deep-fry pan 2 is provided with an air suction hood fitted with a replaceable grease filter 12 and it is connected to a turbine 13. The output of turbine 13 is connected to an aperture (not shown) provided half way up pan 2. In the connecting duct (also not shown) there is placed a water vapor condensation and condensate removal device. Pan 2 contains a deep-fry basket 1 whose bottom 14 is made from an open lattice. On the same side as door 5, the basket is extended by a stainless steel solid part forming deflector 15. The flat bottom of this deflector 15 is coextensive with door 5 and is fixed thereto. Thus, basket 1 is integral with door 5. The bottom of door 5 is pivotably mounted on the wall of pan 2. A pair of jacks 16 and 17 (FIG. 4) control the opening of door 5. Jack 16 moves the door between its closed position and position P1 (FIG. 1) and jack 17 between this position P1 and position P2 (FIG. 1). When door 5 is closed the silicon seal is crushed in a housing provided for this purpose under the action of the pressure exerted by jack 16.

The oil reservoir 3 is in the form of a cylinder in which slides a piston 18 subjected to the action of a jack 19. The bottom of reservoir 3 is provided with an oil discharge opening 20 and an oil readmission opening 21 provided with a value 22 which only opens under the effect of a negative pressure inside reservoir 3. The oil discharge opening 20 of reservoir 3 is connected by a duct 23 to the oil supply opening 6 of pan 2 and the oil removal opening of pan 2 is connected by a duct to the oil readmission opening 21 of reservoir 3.

Duct 23 is included in duct 24 which forms a sleeve and whose base is provided with electric heating means adapted to heat the oil to the desired deep-fry temperature, adjusted by means of a thermostat 26. A safety thermostat (not shown) is also provided for interrupting the heating in the case of overheating.

The oil level in reservoir 3 is maintained constant by means of an appropriate reserve R (shown in FIG. 2).

Figure 6:
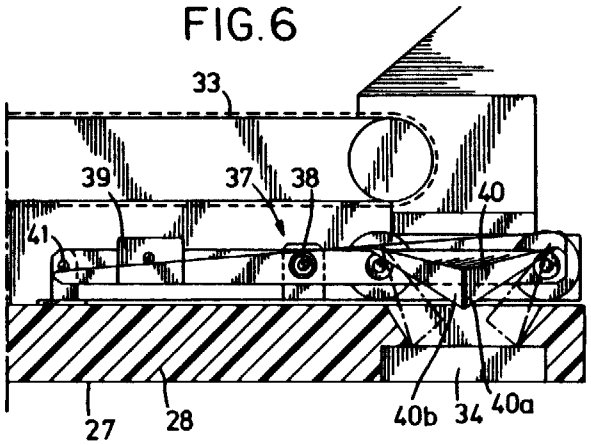
FIG. 6 shows in section the means for proportioning the frozen foods.
Figure 5:
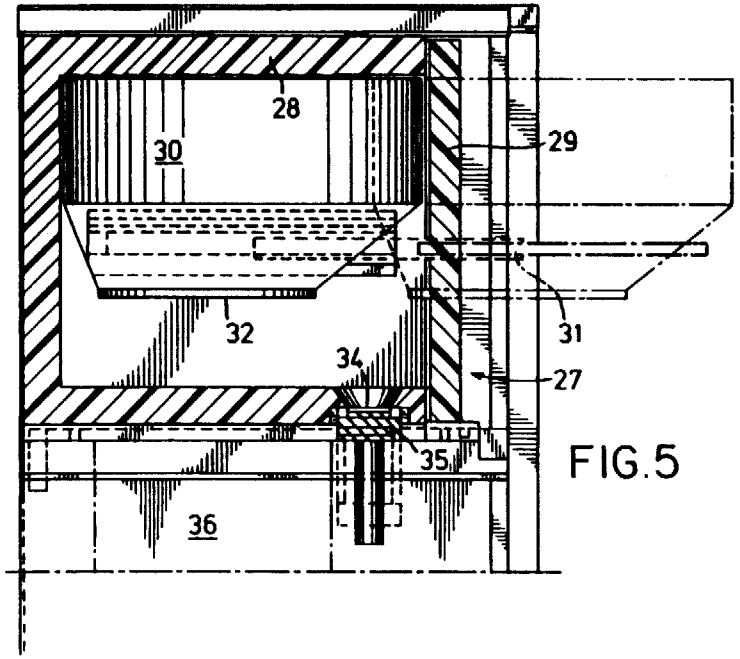
FIG. 5 shows in section the unit for conserving and distributing frozen foods.

Referring now to FIGS. 5 and 6, it can be seen that the unit for conserving and proportioning the frozen foods is formed by a compartment 27 provided with thermal insulation 28. Refrigerating means 36 are provided, adapted to maintaining a temperature suitable for conserving the frozen foods, such as −18° C., compartment 27 opens through a lateral door 29 which allows a storage container 30 to be removed therefrom. This container 30 slides in appropriate slides 31. The base of container 30 forms a hopper 32 whose aperture opens above a conveyor belt 23 (FIG. 6).

A food removal opening 34 is formed in the base of enclosure 27. Opening 34 can be closed by means of a pivotable trap 35.

There is provided in compartment 27 a balance 37 whose beam pivoting about axis 38 is provided, on one of its arms, with a counterweight 39 and, on the other of its arms, with a receiving scale 40.

The counterweight is chosen depending on the weight of frozen foods forming a portion. On the arc described by the end of the arm carrying the counterweight are provided switch means 41 acting on the circuit controlling the advance of the conveyor belt 33.

The receiving scale 40, which is straight under one of the ends of conveyor belt 33, is formed in two parts 40a and 40b able to move toward or away from each other. In the closed up position, they form a recipient for the foods falling from the conveyor belt 33. Their moving away is controlled by external solicitation, such as the introduction of a coil into an appropriate control device.

Opening 34 of the enclosure 27 is situated directly in line with deflector 15 of basket 1 when door 5 occupies position P1.

Position P2 directs this same deflector towards a cup (not shown) which comes from a cup distributing unit (not shown).

The operation of the deep-fryer is as follows:

Between two uses, a previously weighed food portion is ready on the receiving scale 40 of the balance inside the conservation and proportioning unit. The deep-fry pan 2 is closed and empty. Piston 18 of the oil reservoir is at the top of its travel and the oil fills duct 23. The electric heating means 25 are on, maintaining this oil at a temperature of the order of 180° C.

When the user desires a food portion, he operates the different mechanisms of the deep-fryer, either by pressing a button or by inserting a coin or a token into an appropriate device.

The piston then moves down into reservoir 3, discharging oil into duct 23. Under the effect of the pressure, valve 8 of the supply opening opens and a quantity of oil at 180° C. is fed into the deep-fry pan 2. At the end of travel of piston 18, there is no further pressure exerted and valve 8 closes again. At the same time as the piston, turbine 13 was actuated, and it causes the air to circulate in a closed circuit while filtering it as it passes therethrough.

Simultaneously, jack 16 pushes door 5 back to position P1 while tilting basket 1 so that its deflector 15 comes in line with the opening 34 of the food conservation unit 27. Trap 35 then pivots and lets fall into basket 1 the food portion which the receiving scale 40 of the balance supported up to that time. The two parts 40a and 40b of this scale move apart, in fact, at the same time as the trap opens. Jack 16 closes door 5 again while plunging at the same time basket 1 and its contents into the deep-fry bath.

After about 40 seconds, the cooking is finished; piston 18 moves up again while drawing the deep-fry oil through the filtering device 9 covering the removal opening 7 of pan 2, the oil passes into the duct 24 and is readmitted into reservoir 3 through the opening 21 by pushing back valve 22.

During emptying of pan 2, the fried foods are drained. Jack 16, then jack 17, push door 5 back to position P2. The fried foods then fall from basket 1 into an appropriate cup. Jack 17, then jack 16 close door 5 again.

During this time, the circuit of the conveyor belt 33 has been switched on, frozen foods have fallen into the receiving scale the desired weight is reached, conveyor belt 33 is stopped, a new frozen food portion remaining ready on the receiving scale 40. Turbine 13 stops and the deep-fryer may then be actuated again.

Figure 7:
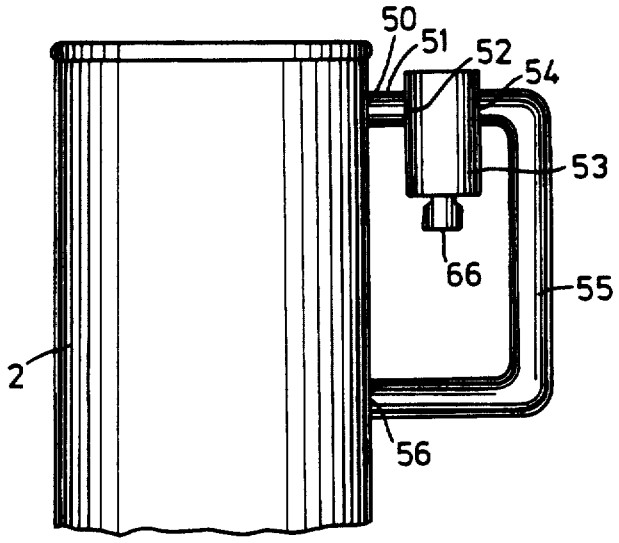
FIGS. 7 and 8 illustrate an alternative embodiment of the air circulating system which can be used in conjunction with pan 2.
Figure 8:
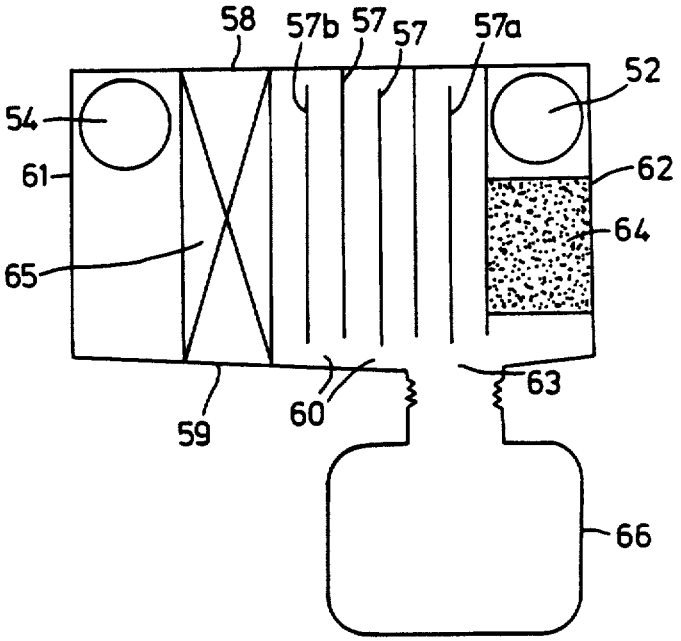

Referring now to FIGS. 7 and 8, there is shown an automotive embodiment of the air circulating system which can be fitted on the pan 2. In this arrangement the top of pan 2 is closed and an aperture 50 is provided in the upper part of the pan wall. Aperture 50 is connected by a duct 51 with the inlet 52 of a filtering device 53, the outlet of which is connected by a duct 55 to the aperture 56 provided half way up pan 2. Filtering device 53 includes a series of partition walls 57 which extend from the top and bottom walls 58 and 59 of the filtering device and stop at a distance of the bottom and top walls 59 and 58, respectively, thus defining a zigzag way.

Bores 60 are provided in the lower part of the partition walls 57 extending from the bottom wall [58] *59* of the filtering device 53. Bottom wall [58] *59* slopes from the side walls 61 and 62 to aperture 63 provided in said bottom wall [58] *59*.

A grease filter 64 is interposed on the zigzag way between the inlet 52 and the first partition wall 57a and a fan 65 is provided between the last partition wall 57b and outlet 54.

Aperture 63 is connected with a condensate collecting tank 66.

The operation of the air circulating system is as follows:

Fan 65 is actuated as turbine 13 of FIG. 1. Air containing grease and water vapors, sucked by fan 65, exits from pan 2 through aperture 50 and passes through grease filter 64 which traps air-borne greases. Thereafter, air travels along the zigzag way defined by partition walls 57. Air-borne moisture [condensates] *condenses* on said partition walls 57 and [flow] *flows* along these partition walls. Condensates flow thereafter along the bottom wall [58] *59*, through bores 60, and are recovered in tank 66. After its passage through fan 65, air exits through outlet 54 and enters again into pan 2 through aperture [52] *56*. Grease filter 64 is replaced and condensate collecting tank [64] *66* is emptied when needed.

While the invention has been described in connection with what is presently considered to be the most practical and preferred embodiments, it is to be understood that the invention is not to be limited to the disclosed embodiments but on the contrary, is intended to cover various modifications and equivalent arrangements included with the spirit and scope of the appended claims which scope is to be accorded the broadest interpretation so as to encompass all such modifications and equivalent structures.

I claim:

1. An industrial deep-fryer for frying refrigerated foods to be consumed after frying in oil comprising:

a frying pan formed from a closed enclosure having an opening and an air inlet and outlet;

a frying basket mounted in said enclosure for holding food during frying in said pan;

a door closing said opening and movable between an open and closed position;

means for directing said refrigerated food into said basket for frying when said door is in an open position;

means for supplying oil to said pan; and means connected between said air inlet and outlet for circulating oil [and] *having entrained* for droplets [entrained in the air therebetween] without [release of] *releasing* entrained oil to the atmosphere outside said pan and *for* condensing moisture and collecting entrained oil droplets.

2. A deep-fryer as in claim 1, wherein said [supplying] means *for supplying oil to said pan* includes:

an oil reservoir;

an oil duct interconnecting said reservoir and said pan;

means for heating oil in said duct; and means for supplying oil from said reservoir to said duct so that heated oil is supplied to said pan to fry foods in said basket.

3. A deep-fryer as in claim 2 wherein said supplying means includes an oil piston.

4. A deep fryer as in claim 3, wherein said oil piston supplies a quantity of oil to said duct resulting in the transfer of a like quantity of oil from said duct to said pan.

5. A deep-fryer as in claim 1, wherein said basket is movable with said door, the door being mounted on an enclosure wall of said pan.

6. A deep fryer as in claim 5, wherein said opening is a lateral opening in said enclosure wall.

7. A deep fryer as in claim 5, further comprising:

a deflector associated with said basket for directing food to and from the basket when said door is in the open position.

8. A deep fryer as in claim 7, wherein said deflector includes a food deflecting surface integral with [said] *a* swingably mounted door.

9. A deep-fryer as in claim 1 wherein said food directing means includes:

a refrigerated food container;

conveyor means for receiving refrigerated food from said container and conveying said refrigerated food;

a balance having a scale for receiving said refrigerated food from said conveyor means and discharging the refrigerated food therein into said basket; and means controlling the advance of said conveyor means in accordance with the quantity of refrigerated food delivered to said scale.

10. A deep-fryer as in claim 9, wherein said scale includes two pivotably mounted elements which are pivoted away from each other to discharge the contents thereof.

11. A deep fryer as in claim 1, wherein said air circulation means comprises a substantially closed system having a recirculating air path between said inlet and said outlet for condensing moisture and removing oil droplets flowing within said air path without exposure of oil-containing air to the atmosphere external to said frying pan enclosure.

12. A deep fryer as in claim 11, wherein said air circulation means includes a detachable receptacle for retaining condensed moisture and oil removed from the circulated air for later disposal at a location remote from the fryer.

13. An industrial deep-fryer for frying frozen foods to be consumed after frying in oil comprising:

a pan formed from a closed enclosure having a lateral opening and having an air inlet and outlet;

means for supplying oil to said pan;

a perforated basket for dipping said foods in the oil in said pan for frying;

a door sealing hermetically said lateral opening in a first position and movable between said first position and at least a second position;

a deflector mounted for movement with said door for deflecting said foods into said basket when said door is in said second position;

means exterior to said enclosure for storing frozen foods and supplying said foods to said deflector when said door is in said second position; and means connected between said air inlet and outlet for circulating air and oil droplets in the air therebetween without exposure to the atmosphere outside said pan and condensing moisture and collecting oil droplets which are retained therein.

14. Apparatus for vending freshly fried foods to be consumed upon completion of the frying thereof in oil, comprising:

a frying pan enclosure having an opening therein for receiving and discharging foods to be fried, and an air inlet and an air outlet;

a door closing said opening and movable between an open position for receiving or discharging food to be fried and a closed position for sealing the enclosure during frying;

means for dispensing a refrigerated food portion into said frying pan when said door is in the open position;

means for supplying a quantity of oil to said pan sufficient to deep-fry said food portion;

*means for delivering said food portion for consumption;* means for circulating air between the air inlet and outlet of said frying pan during frying of food therein; and means coupled to said circulating means for collecting oil droplets entrained in said circulated air and carried out of said frying pan, substantially to prevent the release thereof to the external atmosphere.

15. Apparatus according to claim 14, further comprising:

a refrigerating compartment for storing refrigerated food and for supplying said dispensing means.

16. Apparatus according to claim 14, wherein said dispensing means includes:

means for measuring a predetermined quantity of food constituting said refrigerated food portion; and means responsive to said measuring means for supplying refrigerated food thereto until said predetermined quantity of [good] *food* has been measured.

17. Apparatus according to claim 14, further comprising:

a frying basket for holding foods for frying;

said basket being movable with said door between the closed door position, wherein foods are immersed in oil contained within said frying pan, and at least one open door position wherein said basket is positioned to receive a refrigerated food portion from said dispensing means.

18. Apparatus according to claim 17, wherein said basket is movable to a second open door position wherein foods which have been fried may be discharged from said basket into a vending receptacle.

19. Apparatus according to claim 14, further comprising:

condensing means in said [air circulation path] *means for circulating air between the air inlet and outlet* for removing from said circulated air, moisture associated with entrained oil droplets.

20. A deep-fryer as in claim 1, wherein:

said frying pan enclosure is hermetically sealed when said door is in the closed position.

*21. A deep-fryer for frying foods to be consumed after frying in oil comprising:*

*a frying pan formed from a closed enclosure having an opening and an air inlet and outlet;*

*a frying basket mounted in said enclosure for holding food during frying in said pan;*

*a door closing said opening and movable between an open and closed position;*

*means for directing said food into said basket for frying when said door is in an open position;*

*means for supplying oil to said pan; and*

*means connected between said air inlet and outlet for circulating air and oil droplets entrained in the air therebetween without release of entrained oil to the atmosphere outside said pan to provide at least partial condensation and collection of air-borne moisture entrained therein.*

*22. A deep-fryer as in claim 21, wherein said supplying means includes:*

*an oil reservoir;*

*an oil duct interconnecting said reservoir and said pan;*

*means for heating oil in said duct; and*

*means for supplying oil from said reservoir to said duct so that heated oil is supplied to said pan to fry foods in said basket.*

*23. A deep-fryer as in claim 22 wherein said supplying means includes an oil piston.*

*24. A deep-fryer as in claim 23, wherein said oil piston supplies a quantity of oil to said duct resulting in the transfer of a like quantity of oil from said duct to said pan.*

*25. A deep-fryer as in claim 22, further comprising:*

*a deflector associated with said basket for directing food to and from the basket when said door is in the open position.*

*26. A deep-fryer as in claim 25, wherein said deflector includes a food deflecting surface integral with a swingably mounted door.*

*27. A deep-fryer as in claim 25, wherein the means for supplying oil from the reservoir to the duct is an oil piston providing negative pressure.*

*28. A deep-fryer as in claim 21, wherein said basket is movable with said door, the door being mounted on an enclosure wall of said pan.*

*29. A deep-fryer as in claim 28, wherein said opening is a lateral opening in said enclosure wall.*

*30. A deep-fryer as in claim 21 wherein said food directing means includes:*

*a food container;*

*conveyor means for receiving food from said container and conveying said food;*

*a balance having a scale for receiving said food from said conveyor means and discharging the food therein into said basket; and*

*means controlling the advance of said conveyor means in accordance with the quantity of food delivered to said scale.*

*31. A deep-fryer as in claim 30, wherein said scale includes two pivotably mounted elements which are pivoted away from each other to discharge the contents thereof.*

*32. A deep-fryer as in claim 21, wherein said air circulation means comprises a substantially closed system having a recirculating air path between said inlet and said outlet for condensing moisture and removing oil droplets flowing within said air path without exposure of oil-containing air to the atmosphere external to said frying pan enclosure.*

*33. A deep-fryer as in claim 21, wherein said air circulation means includes a detachable receptacle for retaining condensed moisture and oil removed from the circulated air for later disposal at a location remote from the fryer.*

*34. A deep-fryer as in claim 21, wherein:*

*said frying pan enclosure is hermetically sealed when said door is in the closed position.*

*35. A deep-fryer for frying foods to be consumed after frying in oil comprising:*

*a pan formed from a closed enclosure having a lateral opening and having an air inlet and outlet;*

*means for supplying oil to said pan;*

*a perforated basket for dipping said foods in the oil in said pan for frying;*

*a door sealing hermetically said lateral opening in a first position and movable between said first position and at least a second position;*

*a deflector mounted for movement with said door for deflecting said foods into said basket when said door is in said second position;*

*means exterior to said enclosure for storing foods and supplying said foods to said deflector when said door is in said second position; and*

*means connected between said air inlet and outlet for circulating air and oil droplets in the air therebetween without exposure to the atmosphere outside said pan to provide at least partial condensation and collection of air-borne moisture entrained therein.*

*36. A deep-fryer as in claims 21 or 35, wherein: said condensation means includes means for removing and collecting from the circulated air at least some of any air-borne oil droplets entrained therein.*

*37. Apparatus for vending freshly fried foods to be consumed upon completion of the frying thereof in oil, comprising:*

*a frying pan enclosure having an opening therein for receiving and discharging foods to be fried, and an air inlet and an air outlet;*

*a door closing said opening and movable between an open position for receiving or discharging food to be fried and a closed position for sealing the enclosure during frying;*

*means for dispensing a food portion into said frying pan when said door is in the open position;*

*means for supplying a quantity of oil to said pan sufficient to deep-fry said food portion;*

*means for delivering the cooked food portion for consumption;*

*means for circulating air between the air inlet and outlet of said frying pan during frying of food therein; and*

*means coupled to said circulating means for collecting oil droplets entrained in said circulated air and carried out of said frying pan, substantially to prevent the release thereof to the external atmosphere.*

*38. Apparatus according to claim 37, further comprising:*

*a refrigeration compartment for storing refrigerated food and for supplying said dispensing means.*

*39. Apparatus according to claim 37, wherein said dispensing means includes:*

*means for measuring a predetermined quantity of food constituting said food portion; and*

*means responsive to said measuring means for supplying food thereto until said predetermined quantity of food has been measured.*

*40. Apparatus according to claim 37, further comprising:*

*a frying basket for holding foods for frying;*

*said basket being movable with said door between the closed door position, wherein foods are immersed in oil contained within said frying pan, and at least one open door position wherein said basket is positioned to receive a food portion from said dispensing means.*

*41. Apparatus according to claim 40, wherein said basket is movable to a second open door position wherein foods which have been fried may be discharged from said basket into a vending receptacle.*

*42. Apparatus according to claim 37, further comprising:*

*condensing means in said air circulation path for removing from said circulated air, moisture associated with entrained oil droplets.*

* * * * *